United States Patent [19]

Malhotra

[11] 4,123,606

[45] Oct. 31, 1978

[54] DEAGGLOMERATION PROCESS

[75] Inventor: Satish C. Malhotra, Parkersburg, W. Va.

[73] Assignee: E. I. Du Pont de Nemours and Company, Wilmington, Del.

[21] Appl. No.: 835,806

[22] Filed: Sep. 21, 1977

[51] Int. Cl.$^2$ .............................................. C08F 6/00
[52] U.S. Cl. ........................... 528/499; 260/42.49; 260/42.55; 264/117; 526/255; 528/491; 528/497; 528/498
[58] Field of Search ............... 528/499, 498, 497, 491; 264/117

[56] References Cited

U.S. PATENT DOCUMENTS

| | | | |
|---|---|---|---|
| 3,087,921 | 4/1963 | Mathews et al. | 526/254 |
| 3,115,486 | 12/1963 | Weisenberger | 528/499 |
| 3,366,615 | 1/1968 | Miller | 528/499 |
| 3,527,857 | 9/1970 | Fitz | 264/117 |
| 3,781,258 | 12/1973 | Kometani et al. | 528/499 |

Primary Examiner—Stanford M. Levin

[57] ABSTRACT

Oversize agglomerates produced during the agglomeration of small granular tetrafluoroethylene polymer particles, are conveyed to an agitation vessel where they are subjected to agitation to convert them to smaller size agglomerates.

4 Claims, 2 Drawing Figures

DEAGGLOMERATION PROCESS

FIELD OF THE INVENTION

This invention relates to an improvement in the method for obtaining agglomerated particles of granular tetrafluoroethylene polymer.

BACKGROUND OF THE INVENTION

The practice of agglomerating finely-divided granular tetrafluoroethylene polymer particles to increase their flowability while retaining their moldability is well known. One method of agglomerating the finely-divided granular tetrafluoroethylene polymer particles is to agitate them in a two phase liquid medium of water and certain organic liquids capable of wetting the particles. The organic liquids are soluble in water to at most about 15% by weight at the agglomerating temperature. An alternate method of agglomerating the particles is to agitate them in water alone.

These agglomeration procedures result in agglomerates of varying sizes, including sizes too large for efficient use in automatic molding machines. Heretofore, these oversize agglomerates were separated from the liquid medium and dried along with the desired size agglomerates. The dried agglomerates were screened to separate out the oversize ones and the oversize agglomerates were then ground into finely-divided particles to be agglomerated again. This procedure results in low productivity of desired size agglomerates because the drying capacity is partially taken up by the presence of oversize agglomerates. Moreover, the physical properties of agglomerates made from oversize agglomerates that have been dried, ground, and re-agglomerated are not as good as those of agglomerates not containing such re-agglomerated particles.

SUMMARY OF THE INVENTION

In this invention, wet oversize agglomerates are conveyed to an agitation vessel where they are subdivided into smaller agglomerates by agitating them in the vessel. The effect of agitating wet oversize agglomerates to subdivide them was not heretofore believed to be a viable solution to the problem referred to further above because it was not believed that such subdivision of the oversize agglomerates would occur by subjecting them to agitation.

More specifically, this invention is an improvement in the process for preparing agglomerated granules of non-melt-fabricable granular tetrafluoroethylene polymer by agitating in an agitation vessel particles of said polymer in which the particle size averages, by weight, between about 5 and about 200 microns, in a liquid medium selected from the group consisting of (a) water and (b) a two-phase mixture of water and an organic liquid which is soluble in water up to at most 15% by weight at the operating temperature of the process and which has a surface tension no greater than about 40 dynes/cm. at 25° C. and in which the organic liquid is present in an amount of 0.1 to 0.5 cc per gram of polymer, said agitation being carried out at a level and for a time sufficient to agglomerate the particles, followed by isolating said agglomerates; the improvement which comprises, after said agitation is carried out, removing agglomerates larger than a predetermined size and agitating the removal oversize agglomerates in an agitation vessel along with water at a level and for a time sufficient to subdivide the oversize agglomerates into a size smaller than said predetermined size, and recovering the subdivided agglomerates.

DESCRIPTION OF THE DRAWINGS

Schematic outlines of procedures described herein by this invention are shown in FIGS. 1 and 2.

DESCRIPTION OF THE INVENTION

I. The Art Agglomeration Procedure

Figure 1:
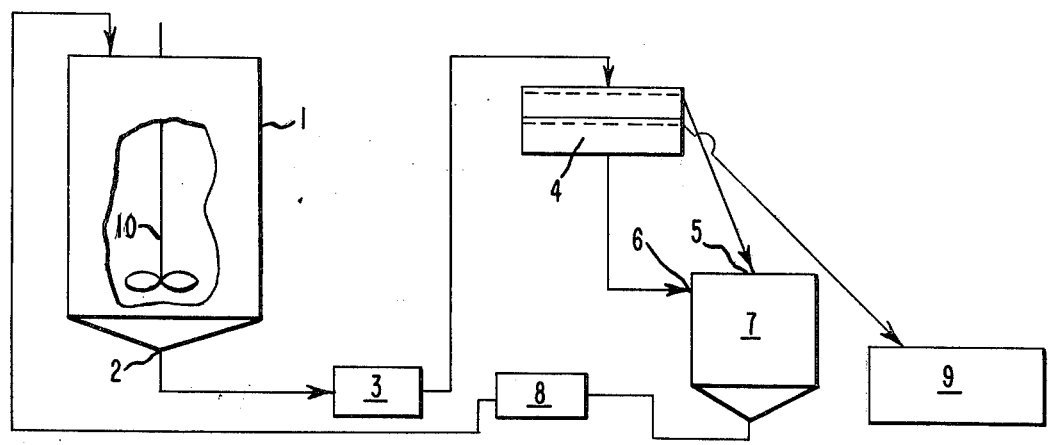

In general, the agglomeration of granular tetrafluoroethylene polymers is well known. By tetrafluoroethylene polymer is meant the homopolymer of tetrafluoroethylene (PTFE) and copolymers thereof wherein the amount of comonomer present in polymerized form is too small to alter the non-melt-fabricable nature of the copolymer. Generally, this small amount will be less than about 2% by weight of the copolymer. The comonomer can be an ethylenically unsaturated copolymerizable monomer, such as a perfluoroalkene of 3-6 carbon atoms, e.g., hexafluoropropylene, or a perfluoro(alkyl vinyl ether) of 3-6 carbon atoms, e.g., perfluoro(propyl vinyl ether), or the like. By the term "non-melt-fabricable", is meant that the polymers have an apparent melt viscosity of at least $1 \times 10^9$ poises at 380° C. Melt viscosity is determined by measuring the tensile creep of a sintered piece held at 380° C. Specifically, 12 g. of molding powder is placed in a 7.6 cm. diameter mold between 0.152 cm. rubber cauls and paper spacers. The mold is then heated at 100° C. for 1 hour. Pressure is then slowly applied on the mold until a value of 140.6 kg./cm.$^2$ is obtained. This pressure is held for 5 minutes and then released slowly. After the sample disc is removed from the mold and separated from the cauls and paper spacers, it is sintered at 380° C. for 30 minutes. The oven is then cooled to 290° C. at a rate of about 1° C. a minute and the sample is removed. A crack-free rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with sliver-coated copper wire. The distance between wrappings is 4.0 cm. This quartz rod-sample assembly is placed in a columnar oven where the 4 cm. test length is brought to a temperature of 380° ± 2° C. A weight is then attached to the bottom quartz rod to give a total weight suspended from the sample sliver of about 4 g. The elongation measurements vs. time are obtained, and the best average slope for the creep curve in the interval between 30 and 60 minutes is measured. The specific melt viscosity, which may be better called apparent melt viscosity, is then calculated from the relationship.

$$\eta \text{app} = (WL_tg)/3(dL_t/dt)A_T$$

where
- $\eta \text{app}$ = (apparent) melt viscosity
- $W$ = tensile load on sample, g
- $L_t$ = length of sample (at 380° C.) cms. (4.32 cm)
- $g$ = gravitational constant, 980 cm./sec.$^2$
- $(dL_t/dt)$ = rate of elongation of sample under load = $\lambda$ slope of elongation vs. time plot, cm./sec.
- $A_T$ = cross-sectional area of sample (at 380° C.), cm$^2$ (area increases 37% at 380° C. over that at room temperature).

The tetrafluoroethylene polymers used are unsintered, are of the granular type made by suspension polymerization (as distinguished from the so-called "fine powder" type made by aqueous dispersion polymerization), and are non-melt-fabricable. Tetrafluoroethylene polymer granules as obtained from suspension polymerization are "clumps" of smaller particles. The granules have an average diameter of about 1000 microns. For general use in agglomeration procedures, these granules are ground into finely-divided particles of an average particle size, based on the weight of particles, of below about 200 microns and usually to about an average size of less than about 100 microns (preferably about 5 microns), for the ability to obtain agglomerates having good molding properties depends on the small initial size of the particles to be agglomerated. The particle size will depend on the degree of grinding.

To agglomerate the finely-divided particles, agitation is carried out under controlled conditions in a liquid medium. The medium can be water alone or can be water and a substantially water-immiscible organic liquid. The substantially water-immiscible organic liquid used should have sufficient immiscibility with the water and sufficient wettability for the finely-divided tetrafluoroethylene polymer to cause formation of the agglomerates on agitation. Generally, the immiscible organic liquid can be soluble in water up to 15% by weight at the operating temperatures of the process. Preferably the solubility will be less than 1%. The wettability of the organic liquid can be expressed in terms of its surface tension, which should be not greater than about 40 dynes/cm at 25° C. Generally, the surface tension should be at least about 10 dynes/cm at 25° C. Examples of immiscible organic liquids useful herein include aliphatic hydrocarbons, such as pentane and dodecane; alicyclic hydrocarbons, such as cyclohexane or methyl cyclohexane; aromatic hydrocarbons, such as benzene, toluene or xylene; and halogenated hydrocarbons, such as tetrachloroethylene, trichloroethylene, chloroform or chlorobenzene; and the like. Generally, the hydrocarbons will contain no more than 12 carbon atoms. The immiscible organic liquid should be present in the water in an amount sufficient to provide a nonaqueous phase which generally is between 0.1 to 0.5 cc of the organic liquid per gram of tetrafluoroethylene/filler blend employed.

The water can be demineralized if desired, but such is not necessary.

A particulate filler material can be present in the liquid medium if a filled agglomerated product is desired. The filler can be any of the usual filler materials for filled tetrafluoroethylene polymers. These include glass (beads, fibers or powder), graphite, powdered bronze, mica, talc, silica, titania, alumina, cryolite and the like. Some metal fillers, such as bronze, can contain particles of other filler materials such as molybdenum sulfide. Such a filler will, however, be predominantly powdered bronze. The filler may be present in an amount of from 5 to 40% by volume (which may be equivalent to about 7% to 65% by weight, depending on the density of the filler) based on the volume of the polytetrafluoroethylene and the filler. The filler should have an average size smaller than the size of the resultant agglomerates so that in the resultant agglomerates, which are usually of 250 to 1000 micron average particle size, the filler particles are largely enveloped by the polymer.

Other additives, such as silicones, aminosilanes, antistatic agents (ammonium carbonate) sodium nitrate or citric acid can also be added. These either reduce filler loss, static charge, or organic contamination.

The mixture to be agglomerated will ordinarily contain from about 2 to about 30% by weight solids.

The order in which the ingredients of the mixture to be agglomerated are mixed together is not important, but usually the water is heated to the desired temperature before adding the other ingredients. The mixture is then slurried by agitation in order to achieve agglomeration. The degree of agitation can be varied to obtain mostly particles of a particular size desired. The degree, temperature and time of agitation are interdependent, e.g., with more vigorous agitation, shorter times can be used. Generally, the mixture is agitated for between about 5 and 120 minutes at a temperature of between about 0° C. and a temperature just below the boiling point at the pressure used (usually about 90° C. where the pressure is atmospheric). For convenience, the agitation may ordinarily be carried out between 10°–90° C., and preferably between 25°–70° C. When the liquid medium is solely water, the temperature is preferably between 40°–90° C. Pressure is not critical and the agitation is usually carried out at atmospheric pressure in a baffled treatment vessel.

Agitation is carried out at a level and for a time sufficient to agglomerate the small, ground particles. Preferable the agitation power will usually be between about 0.15 and 16 kg. m./sec./l. The higher the power, the faster the finely-divided particles agglomerate.

When the medium is a two phase liquid medium, the agitation is preferably carried out in two stages to agglomerate the finely-divided small particle. A first agitation stage is conducted at a power between about 0.5–16 kg. m./sec./l., for about 5–15 minutes; and a second agitation stage is conducted at a power between about 0.15–7 kg. m./sec./l. for 15–55 minutes provided the power is lower than the first stage power. The effect of the second stage is primarily to improve hardness and compaction of the particles.

Whether batch or continuous, a portion of agglomerated mixture and liquid medium is removed from the agitation vessel. The oversize agglomerates are separated, preferably by passing the mixture and medium through a set of two screens. The mesh of the first screen is of such a size that fines and agglomerates of the desired size pass through, while the oversize agglomerates do not. (The agglomerates of the desired size are of no concern to this invention — they are separated from the liquid medium, dried, and are then ready for use in automatic molding machines).

II. The Subdividing of Oversize Agglomerates

The oversize agglomerates are removed from the screen, ordinarily while still wet from the agglomeration medium, and placed in an agitation vessel, along with water. The resulting mixture will ordinarily contain from about 2 to about 30% by weight solids.

The mixture is agitated to achieve subdivision of the oversize agglomerates into smaller size agglomerates. The degree, temperature and time of agitation are interdependent, e.g., with vigorous agitation, shorter times can be used. Generally, the mixture is agitated for between about 1 and 90 minutes at a temperature of between about 0° C. and a temperature just below the boiling point at the pressure used (usually about 90° C. where the pressure is atmospheric). For convenience, the agitation may be carried out between 10°–90° C. and preferably between 25°–70° C. If the liquid medium is solely water, the temperature is preferably between 40°–90° C. Pressure is not critical and the agitation is usually carried out at atmospheric pressure in a baffled treatment vessel.

The agitation is conducted at a level and for a time sufficient to subdivide the oversize agglomerates into smaller size agglomerates. Preferably the agitation power will be between about 19 and about 50 kg. m./sec./l., and most preferably between 24 and 40 kg. m./sec./l. With some vessels, such agitation may create a vortex which obstructs removal of agglomerated mixture during such agitation. If continuous removal is desired in such a vessel, agitation must be decreased to draw off subdivided agglomerates and liquid. After a desired amount is drawn off more rapid agitation can be conducted.

If desired, the vessel employed in this subdivision step can be the same vessel in which agglomeration is carried out, or a different, separate vessel can be used. The subdivided particles are then removed, screened and those of desired size are ordinarily added to desired size agglomerates previously obtained.

The agglomerates produced by this invention find application in ram extrusion and in small part moldings, where good handling characteristics of free flow compositions are desired for use with automatic feeding mechanisms.

In the specific examples which follow, "tensile strength" (TS) and "elongation" are determined in accordance with ASTM D-1457-69, except that the samples were prepared as described in footnote 3 of Table 2.

"Average particle size" is determined by a dry sieving procedure, as follows:

The sieve set (7.62 cm) is assembled in order, with the largest opening on top. The openings in U.S.A. Series Sieve Number are:

18 (1000 micron)
25 (707 micron)
35 (500 micron)
45 (350 micron)
60 (250 micron)
80 (177 micron)
120 (125 micron)

10 grams of the powder to be tested, weighed to the nearest ± 0.01 gram, is charged to the top screen. The screen set is hand shaken for about 3 minutes.

After shaking, the weight of material retained on each sieve is determined to ± 0.01 gram. The cumulative percentage is calculated, as shown in the representative example following:

| Sieve No. | Openings, Microns | Gross Wt. | Tare Wt. | Net Wt. × 10 | Cumulative % |
|---|---|---|---|---|---|
| 18 | 1000 | 95.92 | 94.92 | 10 | 10.0 |
| 25 | 707 | 95.57 | 93.27 | 23 | 33.0 |
| 35 | 500 | 94.31 | 91.01 | 33 | 66.0 |
| 45 | 350 | 91.58 | 89.22 | 23.6 | 89.6 |
| 60 | 250 | 88.04 | 87.20 | 8.4 | 98.0 |
| 80 | 177 | 90.69 | 90.59 | 1.0 | 99.0 |
| 120 | 125 | 84.60 | 84.60 | 0 | 99.0 |
| 170 | 88 | | | | |
| 230 | 63 | | | | |
| 325 | 44 | | | | |

The average particle size and size distribution are determined by plotting the cumulative percentage vs. size on log-probability paper. The average particle size is read from the plot as the size at the 50% abscissa.

EXAMPLES 1A to 1E

Referring to FIG. 1, a 370 gallon (1.4 m$^3$) stainless steel cylindrical tank 1, equipped with an agitator 10, and provided with baffles and means for external steam heating, neither of which is shown, was charged with demineralized water, sodium nitrate oxidant, and perchloroethylene, in amounts set forth in Table 1 for each of Examples 1A to 1E. A 21% (by weight) fiberglass (OCF 739AB size 1/32 inch)/79% finely-divided granular polytetrafluoroethylene (average particle size less than 200 microns and apparent melt viscosity of at least 1 × 10$^9$ poises at 380° C.) blend was added to the mixture at 70° C. under agitation at 350 rpm (power of about 1 kg. m/sec/l). Agitation was carried out for the time shown in Table 1 for "first stage agitation." The level of agitation was then reduced to 200 rpm (power of about 0.19 kg. m/sec/l) and the temperature was reduced to 60° C. for the time shown for "second stage agitation" as in Table 1. At the end of the second stage, agglomerated product slurry was passed through outlet 2 and was pumped by pump 3 through a set of 16 and 80 mesh Dynascreens, 4. The oversized particles were collected on the 16 mesh screen and fed into collecting tank 7 at inlet 5 along with water fed at inlet 6. The resulting slurry, which contained between 2 and 30% by weight polymer solids, was pumped by pump 8 from collecting tank 7, back into the agitation tank 1. The oversized particles in the slurry were vigorously agitated in pump 8 (power of about 31 kg. m/sec/l) to subdivide a portion of them into smaller size agglomerates. The residence time in the pump was short, being on the order of a few seconds (the pump passed 7 gallons of slurry per minute), and the slurry from the pump was cycled through the apparatus a number of times to build up the yield of subdivided agglomerates. On each cycle, subdivided agglomerates of the desired size were collected by the 80 mesh screen and were removed and placed in hold box 9. The total time that the slurry was cycled is shown in Table 1 as "recycle time". The time was increased as each of Examples 1A to 1E was carried out. Agglomerates of the desired size obtained initially and on each cycle were combined and dried in a vacuum dryer (not shown) at a temperature of between 120° and 140° C. and cooled to ambient temperature.

Yield and physical properties of the combined desired size agglomerates are provided in Table 2. It is seen from Table 2 that tensile properties of the product are improved in the process of this invention over the comparison described following.

COMPARISON

The procedure of Example 1E was followed, except that wet oversize agglomerates formed were not recycled, and the first stage ran for 15 minutes and the second stage for 25 minutes. Once-thru yield and physical properties of product are provided in Table 2. It is seen that the yield and tensile properties of this comparative product are low compared with the recycle product obtained from Examples 1A to 1E.

TABLE 1

| Process Conditions | RECYCLE SEQUENCE | | | | | |
|---|---|---|---|---|---|---|
| | Example 1A | Example 1B | Example 1C | Example 1D | Example 1E | Comparison |
| Agglomeration: | | | | | | |
| Water, kg | 954 | 954 | 954 | 954 | 954 | 954 |
| Perchloroethylene, kg | 18.65 | 45.4 | 45.4 | 45.4 | 91.3 | 91.3 |
| Feed Precursor[1], kg | 45.4 | 113.5 | 113.5 | 113.5 | 227 | 227 |
| Sodium Nitrate, g | 895 | 895 | 895 | 895 | 895 | 895 |
| First Stage Agitation Time (minutes) | 15 | 5 | 10 | 7 | 7 | 15 |
| Second Stage Agitation Time (minutes) | 15 | 55 | 30 | 53 | 33 | 25 |
| Recycle Time (minutes) 10 | 36 | 43 | 50 | 58 | 0 | |

[1] 21% fiberglass/79% finely-divided granular PTFE blend.

TABLE 2

| Property | PHYSICAL PROPERTIES OF AGGLOMERATED PRODUCT | | | | | |
|---|---|---|---|---|---|---|
| | Example 1A | Example 1B | Example 1C | Example 1D | Example 1E | Comparison |
| Yield[1], % | 77 | 75 | 77 | 83 | 82 | 52 |
| Glass[2], % | 15.8 | 13.8 | 15.9 | 16.2 | 14.1 | 14.9 |
| Tensile Strength, psi: (MPa) | | | | | | |
| At[3] 5000 psi/2 min psi | 3137 | 3042 | 3069 | 3016 | 3143 | 2918 |
| (34.5 pascals × $10^{-6}$) Pascal × $10^{-6}$ | (21.6) | (21.0) | (21.2) | (20.8) | (21.7) | (20.1) |
| Elongation, % | 281 | 270 | 275 | 279 | 285 | 256 |
| At 2000 psi/3 sec psi | 2772 | 2407 | 2500 | 2623 | 2543 | 2284 |
| (13.8 pascals × $10^{-6}$) Pascal × $10^{-6}$ | (19.1) | (16.6) | (17.2) | (18.1) | (17.5) | (15.8) |
| Elongation, % | 262 | 227 | 248 | 253 | 252 | 220 |
| Particle Size Distribution[4], μ | | | | | | |
| $d_{16}$ | 810 | 600 | 760 | 740 | 700 | 880 |
| $d_{50}$ | 600 | 360 | 450 | 490 | 460 | 650 |
| $d_{84}$ | 390 | 260 | 270 | 370 | 300 | 500 |

[1] Yield = $\frac{\text{weight of product, kg}}{\text{weight of feed precursor, kg}} \times 100$ measured after dry screening and obtaining a 16 to 50 mesh fraction.

[2] Part of the glass present in the feed precursor separates out in the agitation tank during agglomeration, causing reduced glass content of the agglomerated product. No additional glass falls off during recycle.

[3] For measurement of tensile properties, the sample powder was pressed in the mold at the pressure and for the time specified above, and the molded chip was sintered under nitrogen at 370° C for 45 min.

[4] Determined by a dry sieving procedure on a 16 to 50 mesh fraction of dried product.

Figure 2:
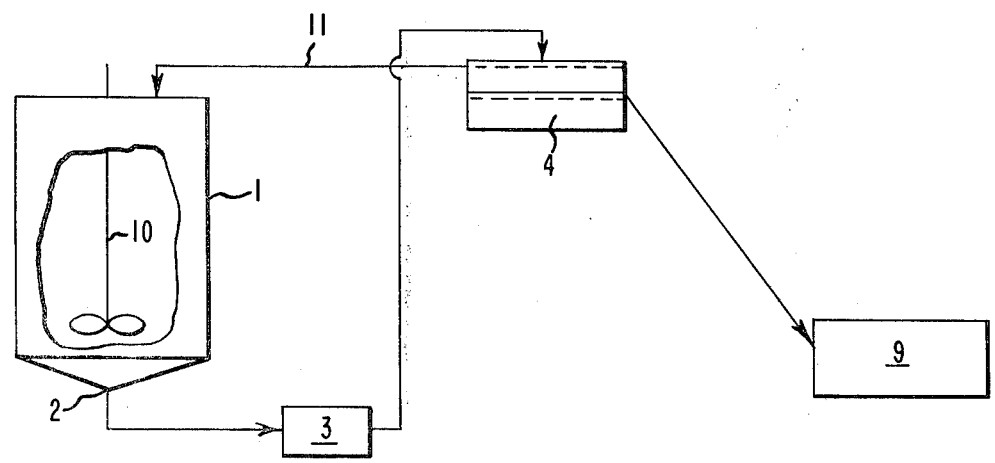

An alternate mode of operation is shown in FIG. 2. Agglomeration takes place in tank 1 equipped with baffles and an agitator 10. Agglomerated product slurry passes through outlet 2 and is pumped by pump 3 through a set of 16 and 80 mesh Dynascreens, 4. The oversize particles are returned along with liquid medium directly through pipe 11 to tank 1 where they are subdivided. Desired size agglomerates are collected in hold box 9.

In still another mode of operation, described in Example 2, oversize particles are subdivided in a separate tank, rather than in tank 1. The subdivided particles are then passed through the screens and desired size agglomerates collected.

EXAMPLE 2

In this Example, finely-divided granular polytetrafluoroethylene was agglomerated as described in Example 1, and the agglomerated product slurry was passed through the two Dynascreens as described in Example 1. The oversize particles were collected on the 16 mesh screen, and a slurry of them in liquid medium was fed into a stainless steel tank 6 inches in diameter and 8 inches deep, equipped with two baffles ½ inch wide. The tank was equipped with a stirrer 3 inches in diameter, having four blades each ½ inch wide with a 45° downpitch. The stirrer was operated at 1500 rpm for 30 minutes to subdivide the oversize agglomerates into smaller size agglomerates. The resulting slurry was passed through the screens and the desired size agglomerates collected, and dried as in Example 1.

88% of the oversize agglomerates were subdivided into desired size agglomerates. Particle size distribution of desired size agglomerates was $D_{16}$ — 730μ; $D_{50}$ — 620μ; $D_{80}$ — 440μ.

The embodiments of the invention in which an exclusive property or privilege is claimed are as follows:

1. An improvement in the process for preparing agglomerated granules of non-melt-fabricable granular tetrafluoroethylene polymer by agitating in an agitation vessel particles of said polymer in which the particle size averages, by weight, between about 5 and about 200 microns, in a liquid medium selected from the group consisting of (a) water and (b) a two-phase mixture of water and an organic liquid which is soluble in water up to at most 15% by weight at the operating temperature of the process and which has a surface tension no greater than about 40 dynes/cm. at 25° C. and in which the organic liquid is present in an amount of 0.1 to 0.5 cc per gram of polymer, said agitation being carried out at a level and for a time sufficient to agglomerate the particles, followed by isolating said agglomerates, the improvement which comprises, after said agitation is carried out, removing agglomerates larger than a predetermined size and agitating the removed oversize agglomerates in an agitation vessel along with water at a level higher than the level used in the agglomeration and for a time sufficient to subdivide oversize agglomerates into a size smaller than said predetermined size, and recovering the subdivided agglomerates.

2. The process of claim 1 wherein the tetrafluoroethylene polymer is polytetrafluoroethylene.

3. The process of claim 1 wherein a filler is present during the agglomeration step.

4. The process of claim 2 wherein the liquid medium is the two-phase mixture defined in claim 1.

* * * * *